(12) United States Patent
Goken (10) Patent No.: US 6,452,608 B1
(45) Date of Patent: Sep. 17, 2002

(54) PROCESS AND DEVICE FOR DISPLAYING INFORMATION ON A SCREEN

(76) Inventor: Klaus G. Goken, Sternstrasse 16, 28857 Skye-Gessel (DE)

( * ) Notice: Subject to any disclaimer, the term of this patent is extended or adjusted under 35 U.S.C. 154(b) by 0 days.

(21) Appl. No.: 09/171,675

(22) PCT Filed: Apr. 24, 1997

(86) PCT No.: PCT/EP97/02083

§ 371 (c)(1),
(2), (4) Date: Mar. 23, 1999

(87) PCT Pub. No.: WO97/41685

PCT Pub. Date: Nov. 6, 1997

(30) Foreign Application Priority Data

Apr. 25, 1996  (DE) .......................................... 196 16 624

(51) Int. Cl.[7] .......................... H04N 5/44; H04N 5/445; G06F 3/00
(52) U.S. Cl. ...................... 345/716; 345/720; 345/722; 345/802; 348/563; 348/569
(58) Field of Search ............................... 345/133, 326, 345/327, 328, 329, 330–331, 352, 354, 348, 350, 619, 700, 705, 716, 719–720, 722, 764, 767, 802, 204–205, 650, 689, 677; 348/569, 563, 564, 565, 731, 734; H04N 5/44, 5/50

(56) References Cited

U.S. PATENT DOCUMENTS

| | | | | |
|---|---|---|---|---|
| 4,270,145 A | * | 5/1981 | Farina | ......................... 358/188 |
| 4,270,146 A | | 5/1981 | Farina | |
| 4,907,082 A | * | 3/1990 | Richards | ...................... 358/143 |
| 5,237,443 A | * | 8/1993 | Kurisu | ..................... 358/192.1 |
| 5,408,275 A | * | 4/1995 | Song | ........................... 348/734 |
| 5,434,626 A | * | 7/1995 | Hayashi | ....................... 348/569 |
| 5,657,091 A | * | 8/1997 | Bertram | ....................... 348/559 |
| 5,737,028 A | * | 4/1998 | Bertram | ....................... 348/563 |

FOREIGN PATENT DOCUMENTS

| | | |
|---|---|---|
| EP | 0342 838 A2 | 11/1989 |
| EP | 0 616 283 A3 | 12/1996 |

* cited by examiner

*Primary Examiner*—Matthew Luu
*Assistant Examiner*—Wessner Sajous
(74) *Attorney, Agent, or Firm*—Patton Boggs LLP (57) ABSTRACT

A method and an apparatus for producing displays of analogous operational parameters on a screen, with a production device set up to generate a display signal consisting of a number of symbols, with the number of symbols approximately proportional to the level and/or the number of adjusted increments of the operational parameter that is allocated to the display signal, wherein a certain symbol of a specific color and/or a symbol of a specific shape is allocated to an adjusted value of an analogous operational parameter, and the symbol is displayed, while the operational parameter is adjusted to an adjusted value, and the color symbols and/or shape symbols for sequential adjusted values differ from each other.

9 Claims, 12 Drawing Sheets

Aus ←→ An

FIG. 5e

PROCESS AND DEVICE FOR DISPLAYING INFORMATION ON A SCREEN

The invention refers to a method and an apparatus for producing displays of analogous operational parameters on a screen, with a symbol production device set up to generate a display signal consisting of a number of symbols, with the number of symbols approximately proportional to the level and/or the number of adjusted increments of the operational parameter that is allocated to the display signal. Such a method is known from DE-A-29 20 023.

The method known in the art is realized in a multitude of applications in different types of screen display devices, such as monitors, TV receivers, satellite receivers and projectors.

Figure 2A:
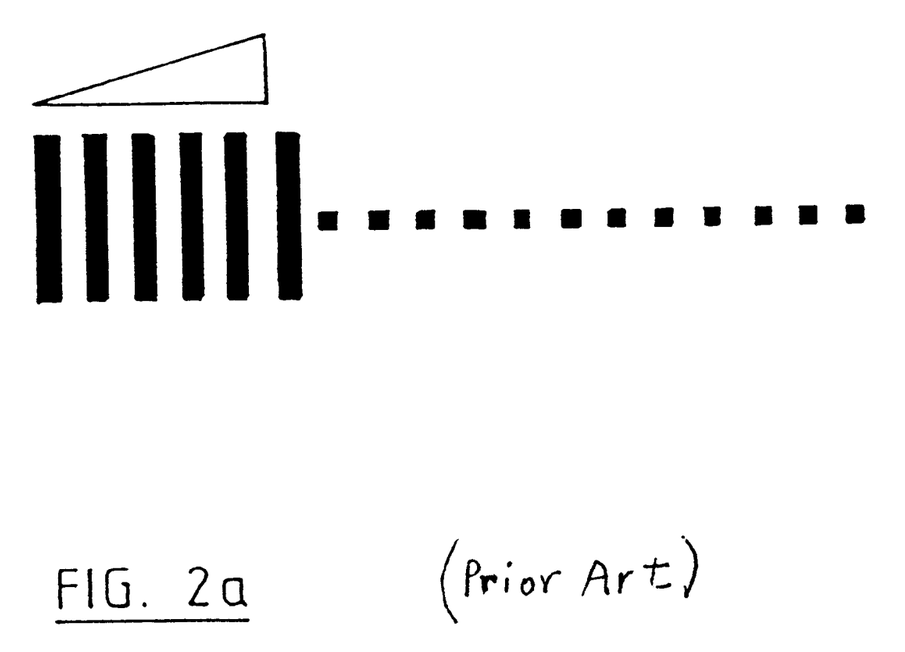
FIG. 2a disclosure of an example of a known screen display.

FIG. 2a) shows a schematic representation of one of the best-known screen display variations.

Known screen displays—on screen displays—can be organized into two essential categories: Symbolic displays and numerical displays. In symbolic displays, symbols, almost exclusively abstract symbols, are generated, and the number of the generated symbols is approximately proportional to the level of the operational parameter, or to the number of the adjusted increments of the incrementally adjustable operational parameter. Accordingly, FIG. 2a represents an example in which six vertically aligned bars—as first symbols—provide the user with information regarding the current setting of the operational parameter.

With known numerical screen displays a number, e.g. the number 6, appears on the screen, and the number itself is approximately proportional to the level of the operational parameter and/or the number of the adjusted increments of the operational parameter. Naturally, there are also examples utilizing elements of the symbolic as well as the numerical display.

In FIG. 2a), to the right of the vertically arranged long bars, small symbols of approximately square shape are arranged—as secondary symbols—, to let the user know to what extent he has modulated the operational parameter that is to be displayed, because the total number of symbols (bars and small symbols) provides the user with a measure as to the maximum modulation of the operational parameter.

The screen displays described above have largely proven themselves, which is why today screen displays of that type have found their way into more than 90% of all TV receivers, monitors, satellite receivers, or other entertainment electronics equipment; along with the fact that with the screen display the user can optimally and easily adjust a desired operational parameter without having to depend on the reproduction of a certain video signal, and because the screen display provides the user with a clear indication of the screen parameter settings. Aside from the numerous advantages of screen displays that are independent of video signal reception, screen displays to date also suffered from several disadvantages. For example, in a screen display as represented in FIG. 2a), the user has difficulty in quickly distinguishing the number of the first symbols, and therefore has difficulty remembering a desired setting. Even though the individual symbols are discernable on the screen display as represented in FIG. 2a), and are therefore easily visible, if the user wishes to remember a setting, the user has to count the symbols individually and must then remember that number, similar to a number on a numerical display.

Consequently, the object of the present invention is to support the memory of the viewer or the user of the screen display device, and to provide a simple operational device for that purpose.

According to the invention, this object is realized with the method captioned in the above claims and the screen display apparatus.

The invention is based on the knowledge that, in general, human memory for colors and shapes is considerably better developed than it is for numbers. For example, even after 20 years, a car owner will remember what color his first car was, but he will long since have forgotten the license plate number. Also, as a rule, human beings have difficulty remembering numbers, such as telephone numbers or house numbers. As indicated above, the same applies for the numerical information with regard to a screen display, in particular, because most often the user is already sufficiently distracted by the reproduced image that he hardly concentrates on any number of symbols, or a numerical display.

With the invention it is, to a certain degree, no longer necessary to remember the number of symbols, as long as the user concentrates on the particular symbol which refers to the increment adjusted most recently, or to the current value of the operational parameter. The user also sees this symbol on screen displays to date, but because this symbol is identical (color, shape) with all adjoining symbols, e.g. in FIG. 2a to the left of the right bar, the user is unable to ascertain the value of the adjusted operational parameter, unless the user counts all the symbols.

With the invention, however, adjoining symbols or symbols for sequential parameter values have different appearances, for example, in terms of color and/or shape. FIG. 1 is a representation of several examples. In the numerical display the number shown is allocated a certain color value and/or shape value, i.e. with a change in the numerical display, there is always also a change in color and/or shape of the numerical display itself or its background. Now, instead of having to remember a number, the user remembers the allocated color and/or shape in order to return to the desired setting, or to remember the current value.

Since different color signals are generated for adjoining numbers, individual symbols appear in different colors on the screen, which not only supports the user's memory but also constitutes a considerable aesthetic improvement of the screen display.

In the following, the invention is explained in greater detail with the assistance of the embodiments that are represented in the drawings. In the drawings are represented:

FIGS. 1a–j disclosure of examples of various displays in accordance with the invention;

Figure 1A:
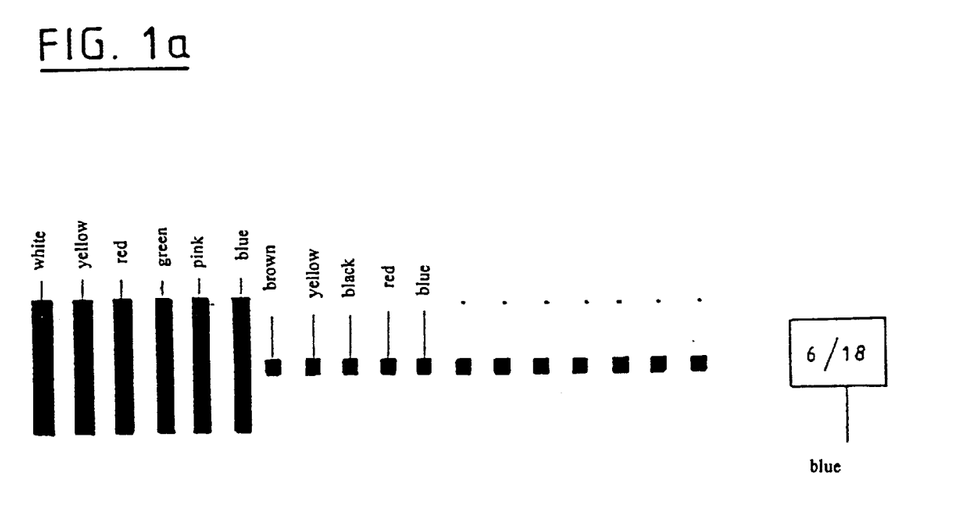
Figure 1B:
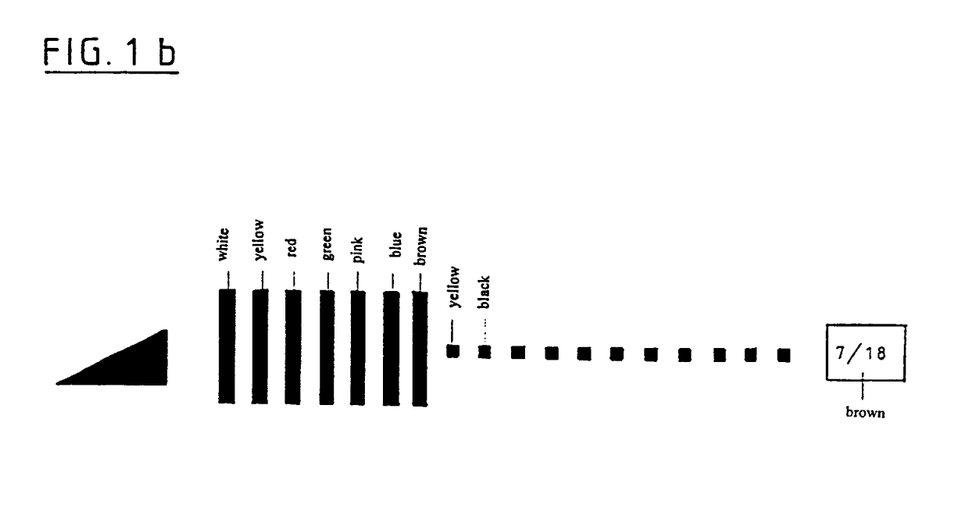

FIG. 1a shows a screen display consisting of a group of first symbols, characterized by colored, vertically aligned bars, and of a group of second symbols, arranged as smaller squares to the right of the bars. Adjoining symbols are executed in plainly different colors. The display in FIG. 1 tells the user that he implemented an adjustment of a physical operational parameter, which corresponds to the first six symbols, and that the first symbol, displayed in blue, indicates the increment that was adjusted last. If the user increases the value of the operational parameter, depending on the proportional relationships of the allocation of the first symbols in relation to the called up increments, sooner or later the second symbol in brown, located in FIG. 1a to the right of the first symbol in blue, will be replaced with a symbol shape in correspondence to the first symbol, but will remain pink [sic: should be "brown"] in color. FIG. 1b represents such a setting.

It is not necessary for the user to remember the number of the first symbol in order to recall the desired setting at a later time, but the user will automatically remember the color of that first symbol which indicates the desired setting.

Naturally, it is also possible that the second symbols consistently appear in the same color, or that the symbols, which in FIG. 1a are arranged to the left of the blue symbol, are uni-colored. It is important, however, that a certain value [representing] a physical parameter, or the symbol representing it, appear in a certain color on the screen. Therefore, adjoining symbol s or operational parameter values should preferably always appear, or be symbolized on the screen in different colors. Of course, a particular color sequence may be repeated after a certain number of symbols.

Figure 1C:
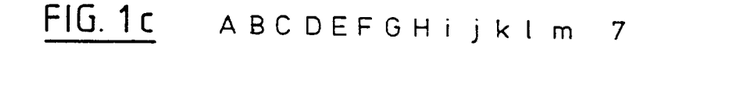

FIG. 1c shows an alternative screen representation in which the first symbols are represented with capital letters, and the second symbols with small letters. Also, the individual symbols differ from each other in terms of their letter value.

Figure 1D:
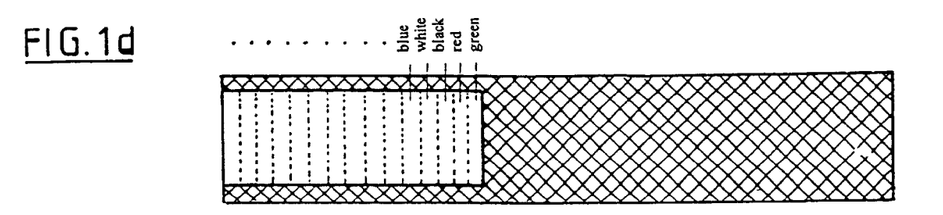

FIG. 1d shows a screen representation that is comparable to FIG. 1a, in which the first symbols are melted to a bar, because there are no gaps between adjoining first symbols.

Figure 1E:
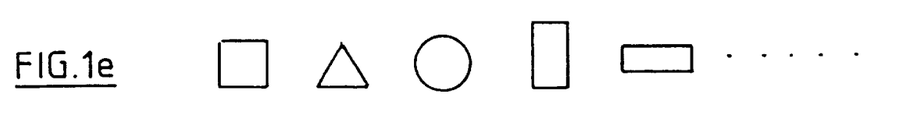
Figure 1F:
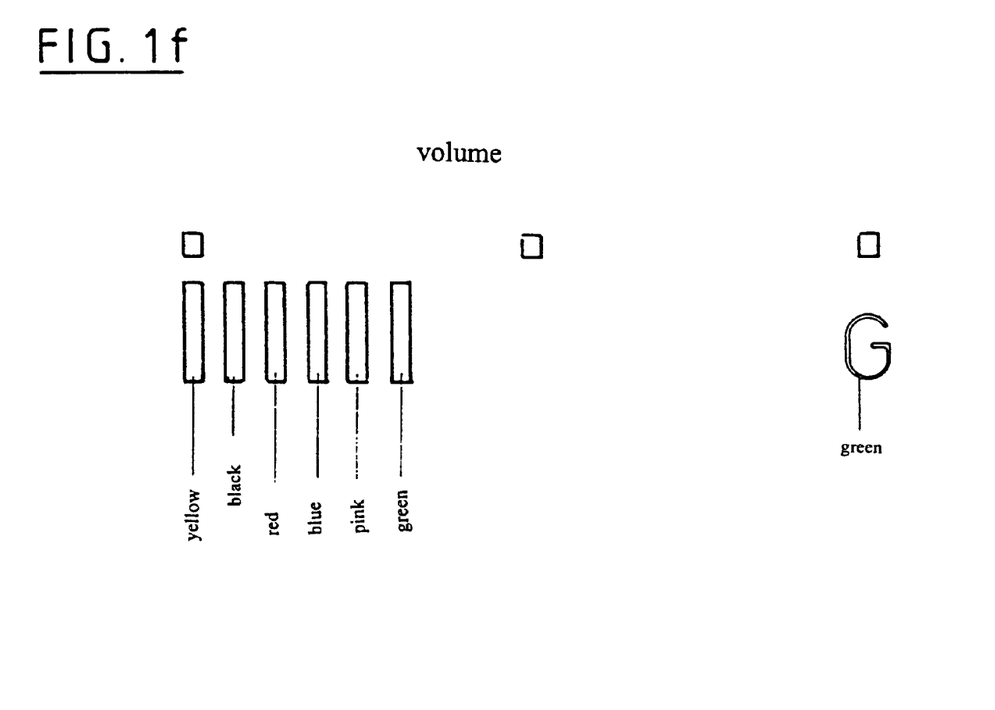

In FIG. 1e, adjoining symbols are represented by different symbol shapes. In FIG. 1f, the second symbols are omitted. Naturally, a numerical display as in FIGS. 1a, 1b can optionally be made to appear on the screen, or may replace the abstract symbols.

Figure 1G:
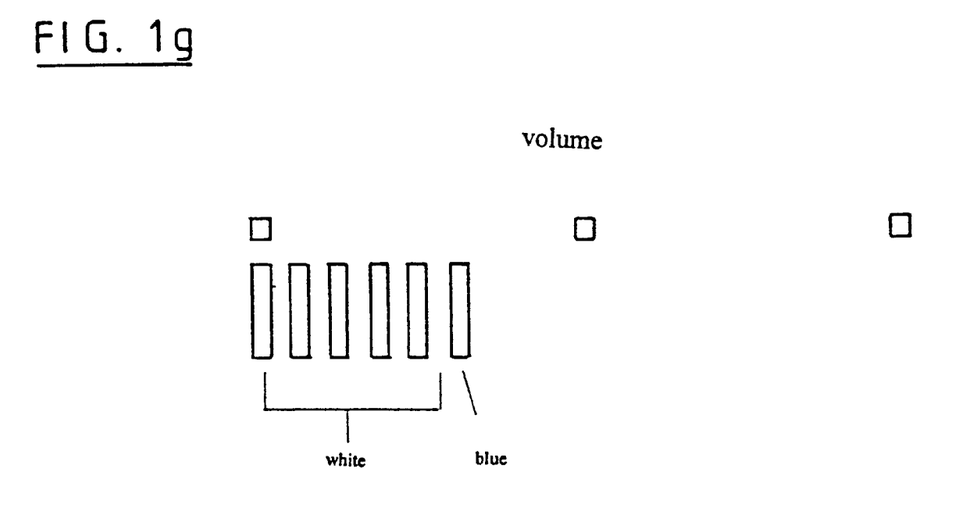

FIG. 1g only shows that symbol in color which indicates the current value of the operational parameter. If the value of the operational parameter increases, and another first symbol is called up, the latter symbol will appear in a different color; for example yellow, and all symbols to the left of the colored (now yellow) symbol will appear uni-colored.

Figure 1H:
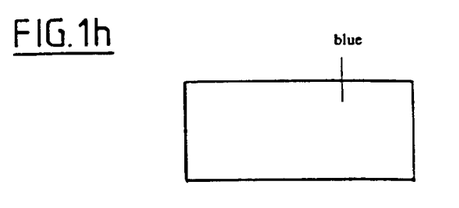
Figure 1J:
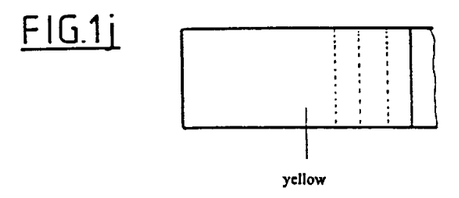

FIG. 1h represents a blue bar consisting of several blue rectangles, which are melted into a single bar. Increasing the operational parameter by one additional increment, i.e. increasing the adjusted value by one unit—compare FIG. 1j—will cause the entire bar to turn yellow and the number of symbols, i.e. the number of rectangles, is increased by 1.

FIG. 2a shows a uni-colored screen display representation known in the art.

Figure 2B:
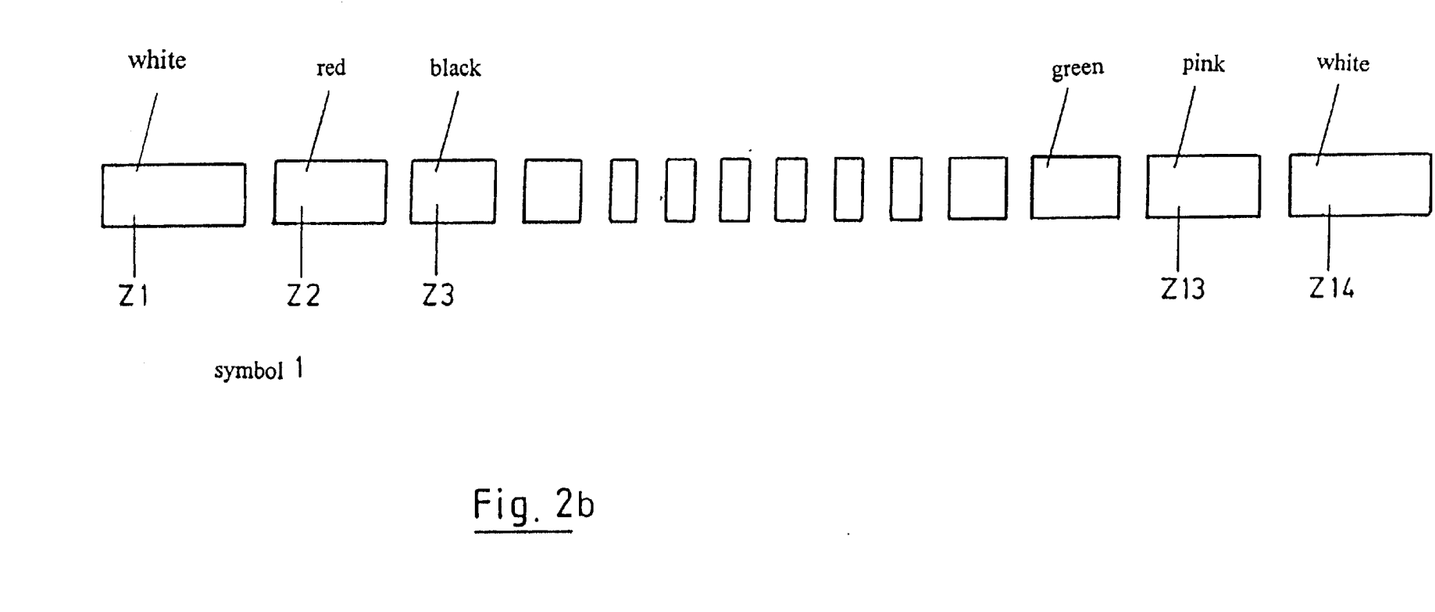
FIG. 2b disclosure of example of an alternative screen display with respect to FIG. 1.

FIG. 2b shows a screen display representation in which the interval size, or the incremental increase of an operational parameter is considerably larger in the maximum range than in the normal range, e.g. room volume level.

In this context, the size or the length of an individual symbol is approximately proportional to the corresponding incremental increase. This allows the user to adjust minute differences in the normal range, e.g at room volume level, while in the minimal and maximal values ranges larger incremental steps are intended; experience has shown that the user is less concerned with minute value adjustments in these ranges. In setting the volume, the following symbol allocations to the incremental increase/interval can be intended:

| Symbol 1 | 10 dB |
|---|---|
| Symbol 2 | 8 dB |
| Symbol 3 | 6 dB |
| Symbol 4 | 4 dB |
| Symbol 5 | 0.5 to 1 dB |
| Symbol 6 | 0.5 to 1 dB |
| Symbol 7 | 0.5 to 1 dB |
| Symbol 8 | 0.5 to 1 dB |
| Symbol 9 | 0.5 to 1 dB |
| Symbol 10 | 0.5 to 1 dB |
| Symbol 11 | 4 dB |
| Symbol 12 | 6 dB |
| Symbol 13 | 8 dB |
| Symbol 14 | 20 dB |

This lets the user enjoy a simplified operation; it addresses personal user wishes, and simultaneously provides the user with information about current operational parameter settings.

Figure 3:
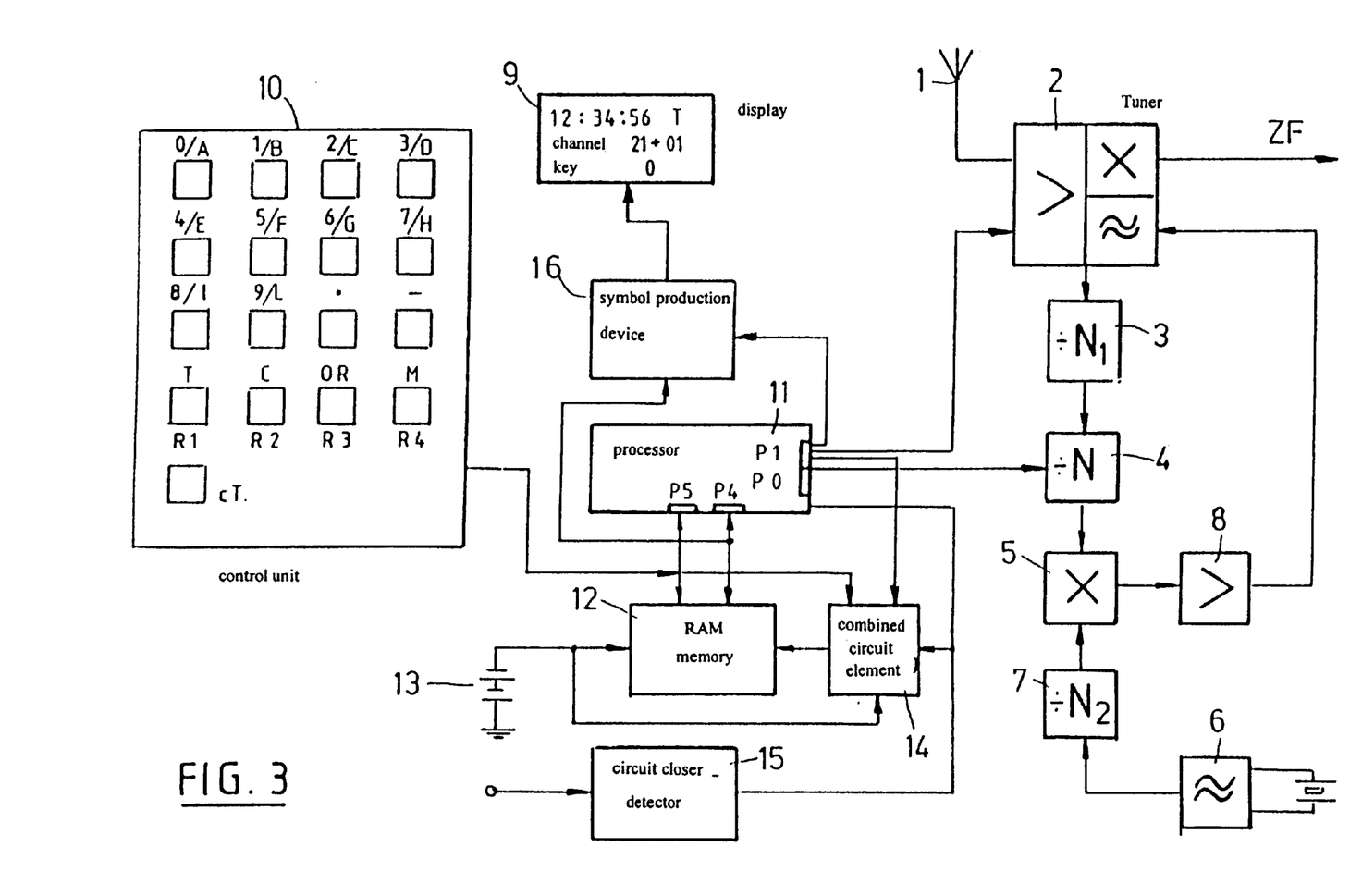
FIG. 3 a modular mimic display of the essential components of an image reproduction device.

FIG. 3 shows a modular mimic display for a reproduction device—in the example shown here, it is a TV receiver—represented with a reception antenna 1 that is connected to a tuner 2 with variable capacitance diodes. At the tuner output, a signal that is transformed to an intermediate frequency IF is available. The tuner 2 can be built in the known fashion, and consists essentially of a selective amplification stage, a mixer and an internal oscillator.

The output of the oscillator is connected to a first frequency divider 3, which divides the oscillator's output frequency by the unchangeable fixed divisor N. The output of the first frequency divider is connected to the second frequency divider 4, which divides the output frequency of the first frequency divider by a variable divisor N, and which can be controlled (triggered) with 12 bit programming signals. Thus, it can divide by any divisor N between 1 nd $2^{12}$.

The output of the second frequency divider 4 is connected to a first input of a phase frequency comparator 5, which has attached a reference signal at its second input, supplied by a crystal generator 6 via a third frequency divider 7. The output of comparator 5 is connected to the control input of tuner 2 by way of an amplifier and filter circuit 8.

In addition, another control unit 10 is intended, e.g. a remote, which has, aside from the other control keys, such as on and off, volume, brightness, contrast, and color balance, 10 additional number keys with the designations 0 through 9 (or as letter keys with the letter designations A through L). On the control unit 10 seven additional auxiliary keys are intended, designated with the symbols +, −, t, c, or, m, ct, (or +, −, r1, r2, r3, r4, ct).

The control unit 10 is connected with a first group of eight input/output ports of a processor [2]11, and with address input ports to a memory 12. In addition, the processor 11 also has a second set of eight input/output ports, which are connected with the data input/output ports of memory 12, and also with the input ports of a graphic symbol generator 16, which can be connected to a display unit 9 (which is part of the receiver unit's picture tube). A third group of 16 ports of the processor 11 is connected with the following ports of the other circuits:

with 12 programming input ports of the second frequency divider 4, with 2 band switching input ports (U and B III) of tuner 2, with a control input port of symbol generator 16, with a first input port of a combined circuit element 14.

Also, the memory 12 has two control inputs, which are connected to the output port of the combined circuit element 14, which, in turn, receives a signal at a second input port from the processor 11, and another signal at a third input port from a circuit closer detector. The detector 15, on its part, receives a signal from the main power supply of the TV receiver, while its output is also connected to a reset input port of processor 11. The memory 12 and the combined circuit element 14, which consists of CMOS elements and requires minimal power, are connected to an internal memory supply terminal, in particular, a battery.

The circuits 3, 4, 5, and 8 in conjunction with the internal voltage-controlled oscillator (VCO) of the tuner 2 form a phaselocked loop, which is controlled in the fashion known in the art by the output signal of the crystal generator 6 that is divided down by the third frequency divider 7.

With suitable control via the keyboard, using in part the usual methods, various operational modes are possible in order to set the predetermined station.

If the user presses an operational parameter programming key on the remote, a screen display in accordance with the representation in FIG. 1 automatically appears. Along with the operational parameter setting a remote command is sent to the device that to be controlled, and this command is processed by processor 11. To control the operational parameter, the processor 11 is connected with the memory 12, in which the operational parameter data and the corresponding interval sizes of the operational parameters are saved. In addition, processor 11 is connected with the symbol generator 16, which is equipped with a symbol memory, in order to produce the display onto the screen. The shape and/or color signals, which are allocated to an adjusted value of an operational parameter, are saved in processor 11, or preferably along with the individual adjusted values in memory 12, and they will be called up when a certain parameter is adjusted and forwarded as corresponding color or shape commands to the symbol generator. As indicated previously, the color and/or shape of signals of sequential adjusted values differ from each other; a multitude of variations is conceivable for the corresponding reproduction with FIG. 1 representing only some of the positive examples.

Figure 4:
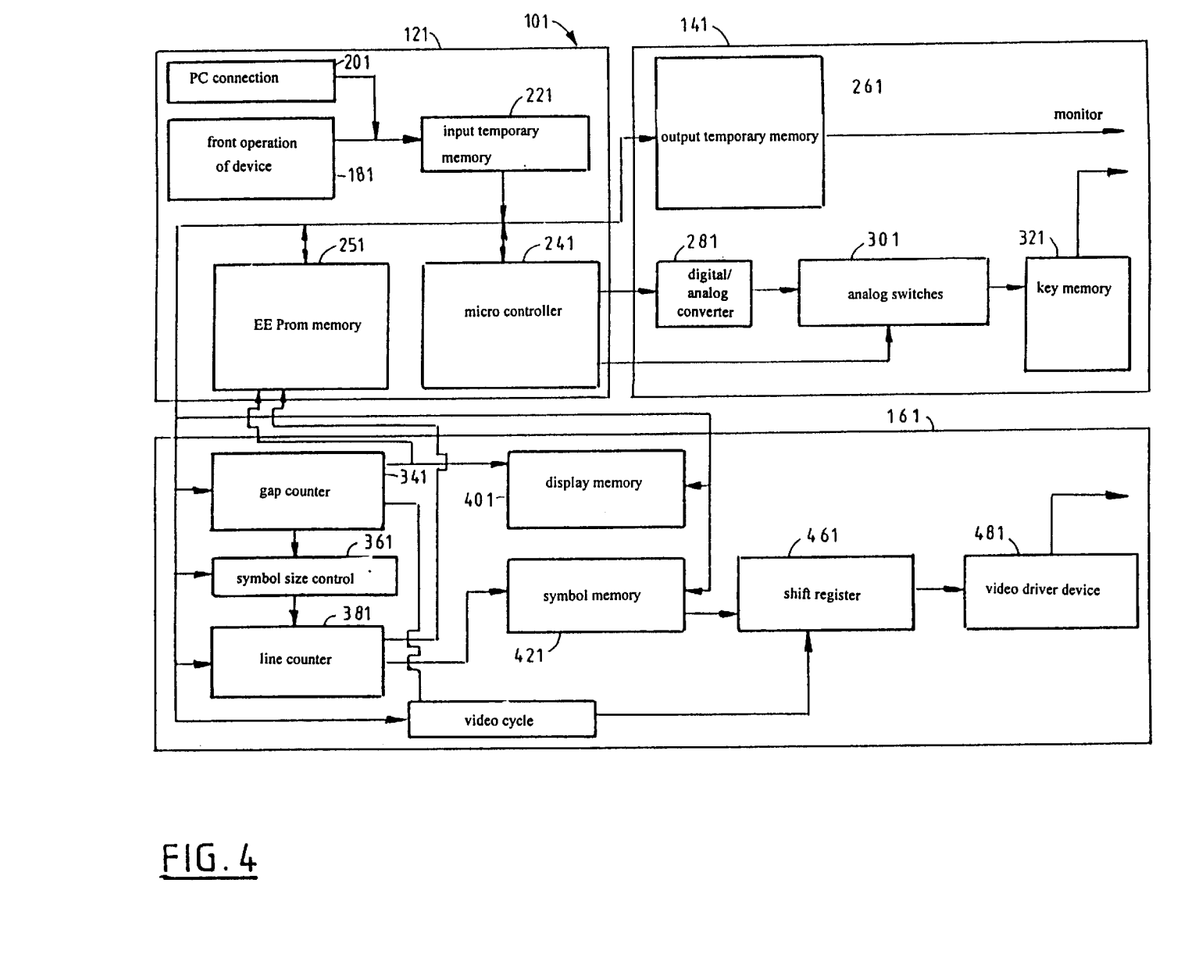
FIG. 4 a modular mimic display of a screen display system.

For a better understanding of the screen display representation reference is made to FIG. 4. The screen display menu system 101 consists of three functional blocks. An input block, a memory block and a control block 121, a video display adjustment block 141 and a symbol display block 161, within block 121, which is either part of a device front operation 181 or of a PC connection 201, corresponding keys can be used to adjust selected operational parameters in the system 101. The entered values are saved for a certain period of time in a temporary memory 221. A micro controller 241 receives this input information from the input temporary memory 221 and saves the modified input values for the operational parameter that is to be displayed in an EEPROM memory 251.

The micro controller 241 is connected in the display adjustment block 141 with a digital/analog converter 281 (DAC), which transforms a digital adjusted value to an analog signal, and transports this signal correspondingly to an analog switch so that an operational parameter value assumes the value that is desired by the user.

The symbol display block 161 contains the hardware to produce and send the screen display information to a display unit (not represented). Ways of symbol production are known in the art from, for example, EP-0 543 089. Following a corresponding command from the microcontroller 241, symbols of predetermined size, shape and color are selected from the symbol memory (symbol PROM) 421 and combined to form a screen display line in the display memory 401. With a video driver device 481 the result is delivered to the display unit and appears accordingly on the desired screen in the desired format. If the value of an operational parameter changes, and hence the number of the first symbols, a modified screen display line composition is implemented and displayed.

An operational parameter can only assume predetermined values which are finally saved in the control block 121, for example, in a chart format in memory 251.

If it is intended, for instance, that with each volume increase, which can only be effected step by step, the next higher volume value should constitute an increase of 5 dB, the incremental increase is 5 dB. If saved accordingly, the desired incremental increases can be predetermined. With a corresponding program allocation of an operational parameter to a symbol, symbol information such as shape, color, size, etc. can be allocated to an increment, and the corresponding screen displays can be assembled.

Figure 5A:
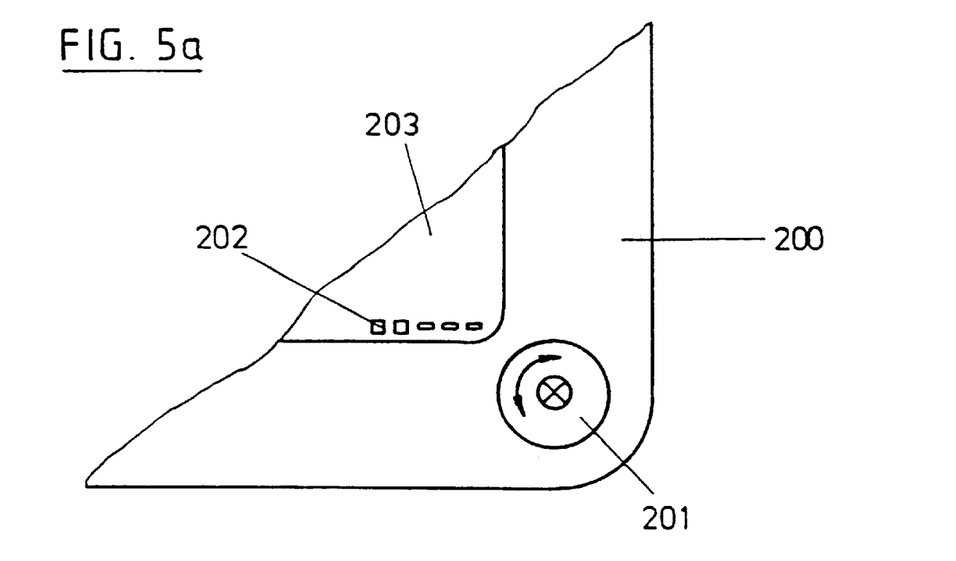
FIG. 5a a view of a control tool in accordance with the invention.

FIG. 5a shows a partial view of an electronic device, e.g. of a TV receiver 200 or a monitor. The device is equipped with a one-piece servo component 201 which calls up and adjusts different operational parameter modes and values, and which can turn the device on and off.

The one-piece servo component 201 is a servo component which can be turned, pushed in and/or pulled out. Allocated to the servo component—compare FIG. 5b—is a motion receiver 204 which reads the user activity of the component and transforms it into corresponding signals, which are processed by a signal evaluation control unit 205, for example, a microprocessor, and are converted to command signals. These command signals are used for the desired control of the device and for calling up a desired screen display signal 202 on the screen 203.

Figure 5B:
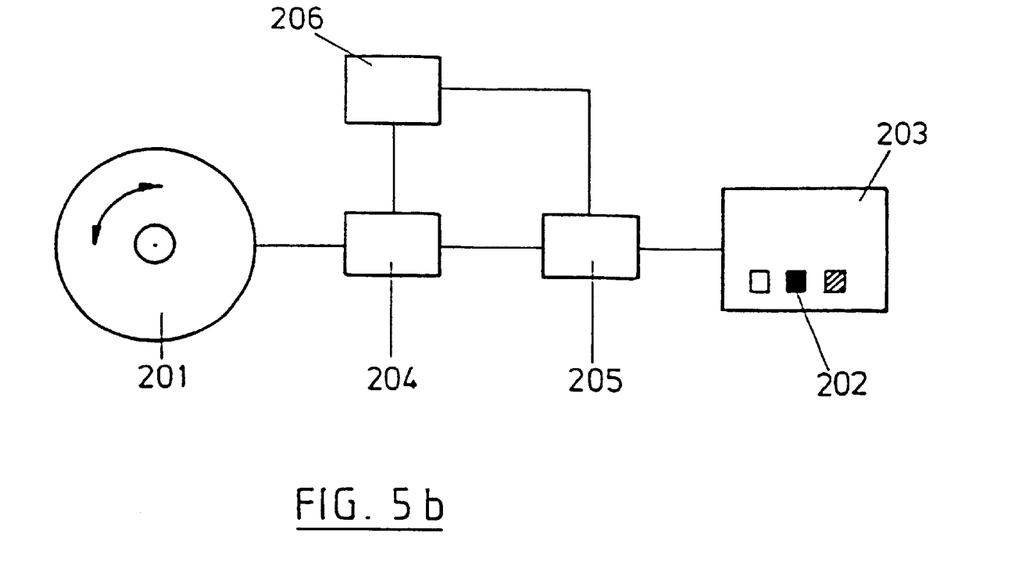
FIG. 5b a modular mimic display with a control tool in accordance with the invention.

Also, the component can be equipped with a timer 206, which records how long a user activity lasts, and sends a corresponding time signal to the evaluation unit. If, for instance, the servo component is pushed in (i.e. into the symbol plane), and a certain period of time is exceeded, the timer sends a command to the evaluation unit, which reads this signal as a signal to turn the unit on or off, depending on the previous operational status, and then turns the device on or off.

Figure 5C:
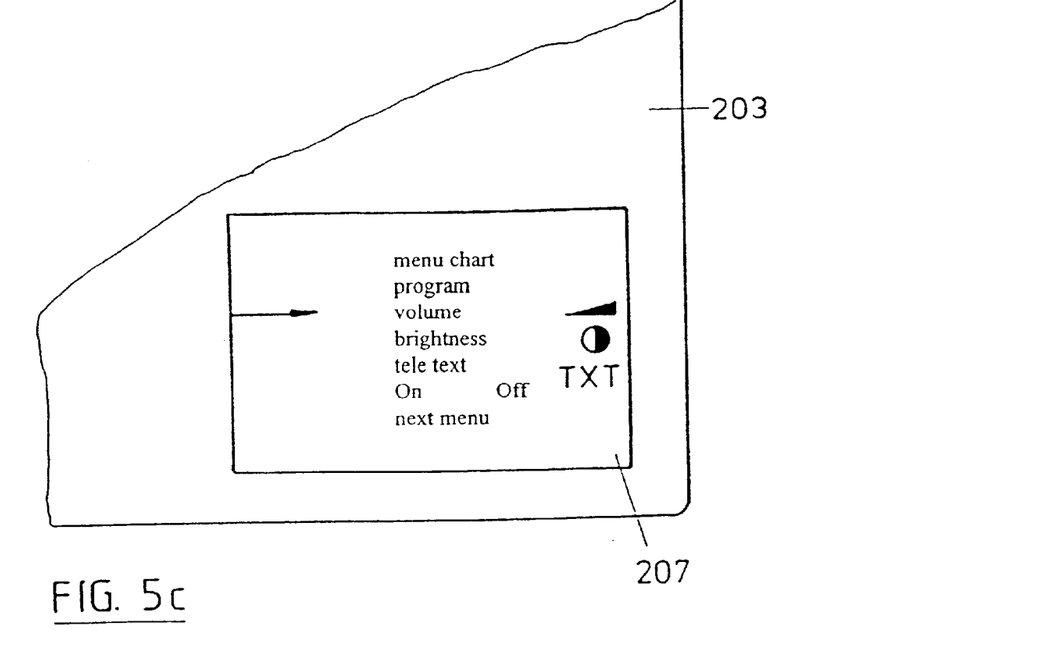
FIG. 5c Example for a view of a menu chart that appears on the screen, and which can be controlled (triggered) with the control tool.

If the servo component is pushed or pulled for a brief predetermined period of time, this information is read in terms of the user wanting to set the next operational parameter mode. In addition, a corresponding menu system is visible on the screen—FIG. 5c—in which a corresponding pointing device, e.g. a cursor or other corresponding color mark, indicates the operational mode, e.g. volume, lightness etc. If the pointing device is located at an operational mode such as volume, by turning the servo component the user can set the desired value. Turning to the left reduces the operational parameter value, turning to the right increases the operational parameter value, while, in accordance with FIG. 1, a screen display 202 appears on the screen.

Thus, all desired functions of the device can be controlled with only one user component.

If the user pushes the servo component in for longer than, for example, 2 seconds, the evaluation unit reads a corresponding turn off signal and the device is turned off completely.

Figure 5D:
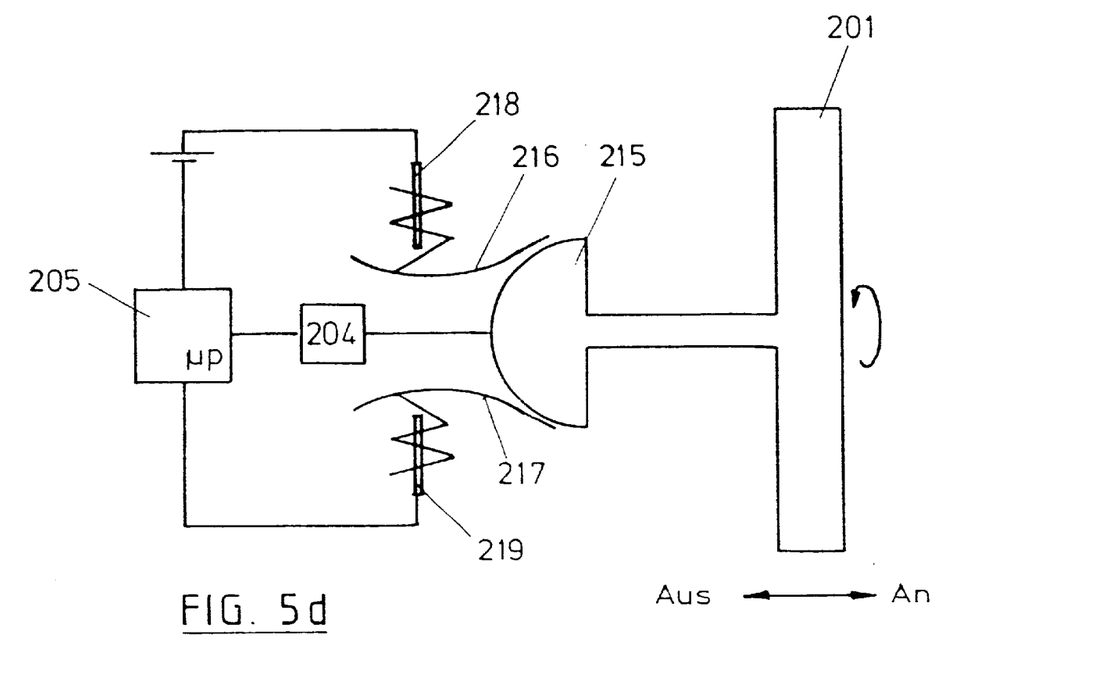
FIG. 5d a side view of a control tool in accordance with the invention.

The turn-off function can also be activated if the user component, after passing a pressure point—compare FIG. 5d—, is pushed in and a corresponding turn-off contact is established after the user component penetrates the device, which is then responsible for turning the unit off. Pulling on or moving the servo component 201 out will result in the unit being turned on. In the view seen in FIG. 5d, the user component 201 is equipped with a head 215 which, if pressed, is received by two spring supported basins (216, 217). Once the spring pressure is overcome, the basins establish contact with corresponding counter contacts 218 and 219, thereby creating a switching contact which is responsible for turning the unit off.

Figure 5E:
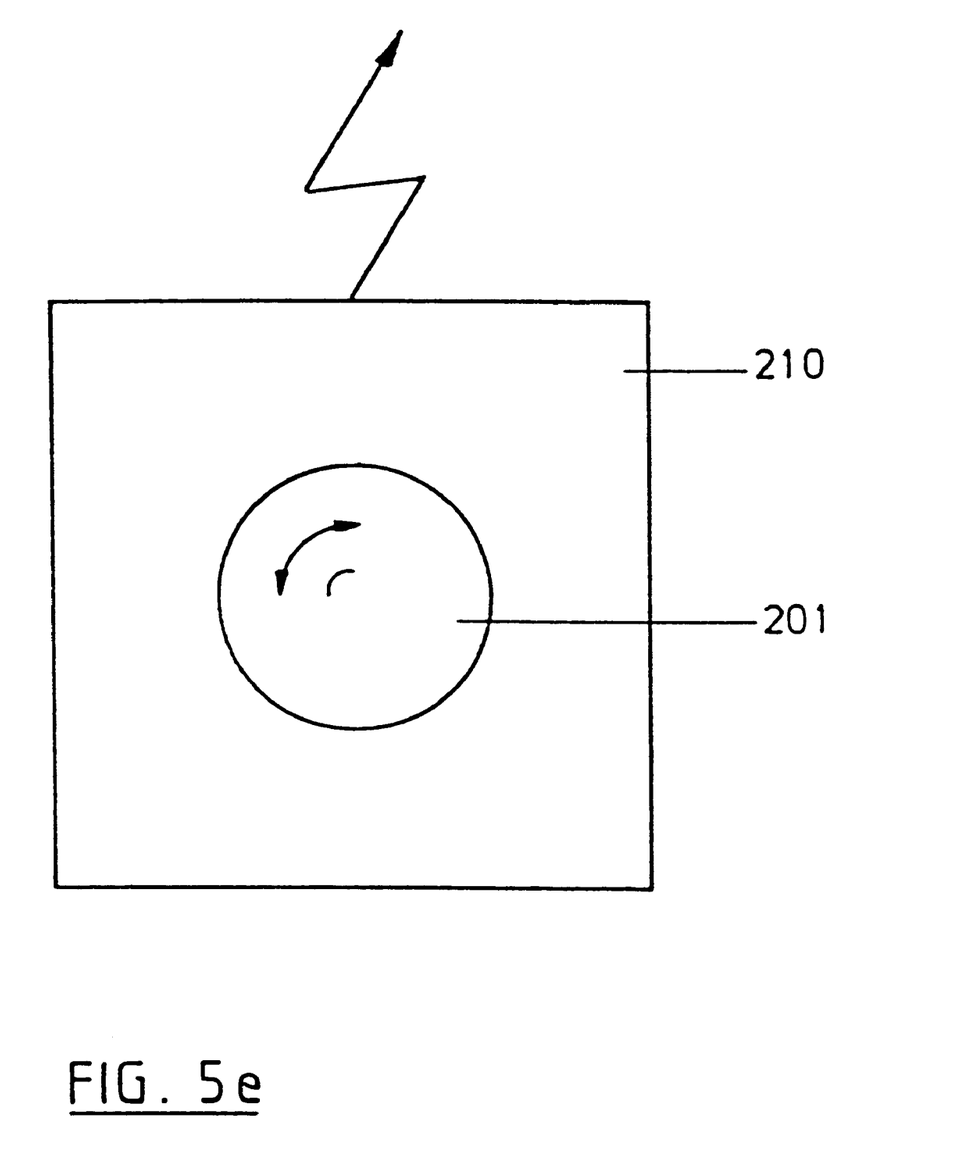
FIG. 5e a top view of a remote control with a control tool in accordance with the invention.

The user component is a very positive supplement to the previously described screen display, but it can also be realized independently from it. Naturally, the one piece servo component 201 can also be modeled on the basis of a remote, as shown in FIG. 5e. Such a remote is equipped with one single user component, which can be used to adjust all or most user functions. For program call-up a ten key pad known in the art may, of course, be intended. Although "trackballs" or "jock shuttles" are known for use on remote controls, they do not provide a turn-off function.

What is claimed is:

1. Screen display apparatus capable of generating a display signal of a physical parameter, with the display signal
   a) consisting of a numerical display value and/or
   b) a number of symbols,
      while
         aa) the shown numerical display value is approximately proportional to the level and/or the number of the adjusted increments of the adjusted value that is allocated to the signal, or
         bb) the number of the symbols is approximately proportional to the level and/or the number of the adjusted increments of the adjusted value that is allocated to the signal, wherein the adjusted value of an operational parameter is allocated a symbol of a certain color and/or a symbol of a certain shape, and the color symbols and/or shape symbols for adjoining symbols or symbol groups of sequential adjusted values of operational parameters differ from each other,
         and wherein, at a normal range of an operational parameter, e.g. at room volume level, the interval size or the incremental increase is smaller than at the maximum range, and/or the different interval sizes or the different incremental increases can be displayed with the allocated symbol itself, i.e. based on position, size, color or shape, and
         wherein the color and/or shape design of a particular symbol and/or numerical display for a preferred parameter setting can be chosen by the user, and can be saved into a memory, and
         wherein the device incorporates the means to adjust several operational parameters, consisting of a one-piece servo component which can be pushed in and/or turned in several directions; with a first movement of the one-piece servo component, the adjustment mode of an operational parameter can be called up, and with another movement of the servo component the value adjustment of the called up operational parameter can be implemented.

2. Screen display apparatus capable of generating a display signal of a physical parameter, with the display signal
   a) consisting of a numerical display value and/or
   b) a number of symbols,
      while
         aa) the shown numerical display value is approximately proportional to the level and/or the number of the adjusted increments of the adjusted value that is allocated to the signal, or
         bb) the number of the symbols is approximately proportional to the level and/or the number of the adjusted increments of the adjusted value that is allocated to the signal, wherein the adjusted value of an operational parameter is allocated a symbol of a certain color and/or a symbol of a certain shape, and the color symbols and/or shape symbols for adjoining symbols or symbol groups of sequential adjusted values of operational parameters differ from each other,
         and wherein the color and/or shape design of a particular symbol and/or numerical display for a preferred parameter setting can be chosen by the user, and can be saved into a memory,
         and wherein the device incorporates the means to adjust several operational parameters, consisting of a one-piece servo component which can be pushed in and/or turned in several directions; with a first movement of the one-piece servo component, the adjustment mode of an operational parameter can be called up, and with another movement of the servo component the value adjustment of the called up operational parameter can be implemented.

3. Screen display apparatus capable of generating a display signal of a physical parameter, with the display signal
   a) consisting of a numerical display value and/or
   b) a number of symbols,
      while
         aa) the shown numerical display value is approximately proportional to the level and/or the number of the adjusted increments of the adjusted value that is allocated to the signal, or
         bb) the number of the symbols is approximately proportional to the level and/or the number of the adjusted increments of the adjusted value that is allocated to the signal, wherein the adjusted value of an operational parameter is allocated a symbol of a certain color and/or a symbol of a certain shape, and the color symbols and/or shape symbols for adjoining symbols or symbol groups of sequential adjusted values of operational parameters differ from each other, and
         wherein the device incorporates the means to adjust several operational parameters, consisting of a one-piece servo component which can be pushed in and/or turned in several directions; with a first movement of the one-piece servo component, the adjustment mode of an operational parameter can be called up, and with another movement of the servo component the value adjustment of the called up operational parameter can be implemented.

4. Screen display apparatus capable of generating a display signal of a physical parameter, with the display signal
   a) consisting of a numerical display value and/or
   b) a number of symbols,
      while
         aa) the shown numerical display value is approximately proportional to the level and/or the number of the adjusted increments of the adjusted value that is allocated to the signal, or bb) the number of the symbols is approximately proportional to the level and/or the number of the adjusted increments of the adjusted value that is allocated to the signal, wherein the adjusted value of an operational parameter is allocated a symbol of a certain color and/or a symbol of a certain shape, and the color symbols and/or shape symbols for adjoining symbols or symbol groups of sequential adjusted values of operational parameters differ from each other, and wherein, at a normal range of an operational parameter, e.g. at room volume level, the interval size or the incremental increase is smaller than at the maximum range, and/or the different interval sizes or the different incremental increases can be displayed with the allocated symbol itself, i.e. based on position, size, color or shape and wherein the device incorporates the means to adjust several operational parameters, consisting of a one-piece servo component which can be pushed in and/or turned in several directions; with a first movement of the one-piece servo component, the adjustment mode of an operational parameter can be called up, and with another movement of the servo component the value adjustment of the called up operational parameter can be implemented.

5. Screen display apparatus as claimed in claim 1, 2, 3 or 4 wherein the one-piece servo component is allocated a timer, which measures the activation time of the one-piece servo component, and depending on the length of a user function, the one-piece servo component turns the device off.

6. Screen display apparatus as claimed in claims, 1, 2, 3 or 4 wherein the one-piece servo component is coupled with a microprocessor which controls a symbol generator, and in accordance with the duration of a use of the one-piece servo component, a display signal is generated, the size of which is approximately proportional to the time the one-piece servo component was engaged.

7. Screen display apparatus as claimed in claims 1, 2 3 or 4 wherein a menu system is intended for adjusting the various operational modes, and as a result of a certain movement, the one-piece servo component calls up an operational mode menu chart, with another movement of the one-piece servo component a pointing device, which indicates certain operational modes, can be localized, and with a third movement of the one-piece servo component the value adjustment of the called-up operational parameter can be implemented and displayed.

8. Screen display apparatus as claimed in claims 1, 2, 3 or 4 wherein the one-piece servo component is developed for use with a remote.

9. TV receiver, satellite receiver, monitor, video recorder, TV card, graphic or display units with a device as claimed in claims 1, 2, 3 or 4.

* * * * *